United States Patent [19]

Paulsen

[11] Patent Number: 4,797,749
[45] Date of Patent: Jan. 10, 1989

[54] SCANNING SYSTEM WITH TUNABLE RESONANT ACTUATOR

[75] Inventor: Dean R. Paulsen, Danvers, Mass.

[73] Assignee: General Scanning, Inc., Watertown, Mass.

[21] Appl. No.: 932,687

[22] Filed: Nov. 18, 1986

[51] Int. Cl.$^4$ .............................................. H04N 1/21
[52] U.S. Cl. .................................. 358/302; 358/205; 358/208; 358/293
[58] Field of Search ............... 358/302, 206, 205, 208, 358/285, 293; 350/255; 318/127, 128

[56] References Cited

U.S. PATENT DOCUMENTS

| | | | |
|---|---|---|---|
| 3,437,393 | 4/1969 | Baker et al. | 358/208 |
| 3,959,673 | 5/1976 | Montagu | 318/127 |
| 4,090,112 | 5/1978 | Selverstone | 318/128 |
| 4,314,154 | 2/1982 | Minoura et al. | 358/206 |
| 4,502,752 | 3/1985 | Montagu | 318/128 |
| 4,525,030 | 6/1985 | Montagu et al. | 350/255 |

Primary Examiner—Clifford C. Shaw

[57] ABSTRACT

A surface-scanning system of the kind that defines an optical path and has a scanning assembly comprised of X and Y angularly oscillating scanners for deflecting a portion of the path, and first and second optical elements aligned with stationary portions of the optical path and driven in rectilinear oscillating motion along the path to provide focus correction respectively for the X and Y scanners. The X direction scanner is of the resonant type and has a mechanism for dynamically tuning its resonant frequency, the first optical element is mounted to oscillate in rectilinear resonant motion, and the tuning mechanism of the X direction scanner is arranged to receive a signal representing the oscillations of the first optical element and to tune the resonant frequency of the X direction scanner to synchronize its resonant motion with that of the first optical element.

8 Claims, 13 Drawing Sheets

SCANNING SYSTEM WITH TUNABLE RESONANT ACTUATOR

BACKGROUND OF THE INVENTION

This invention relates to systems for scanning a surface.

Known scanning systems include laser printers for "writing" an image on a two-dimensional surface and facsimile image transmission devices that "read" an image from such a surface.

In a typical scanning system, the image surface (medium) is scanned in a raster fashion by a fast moving mechanically rotated beam deflector (such as a mirror) in the fast scan direction, X. Scanning in the slow scan direction, Y, is accomplished either by a slow moving beam deflector (driven, e.g., by a galvanometer), or by moving either the medium or the scanning system relative to the other. In all types of systems a lens assembly is used for maintaining focus as the scanning proceeds.

In laser scanning systems, the scanning elements occupy either a pre-objective or post-objective position. In a pre-objective system, the beam from the laser passes through the focusing lens after being deflected. In a post-objective system, the lens is ahead of the scanning elements.

Although a simple lens can be used for a post-objective scanning system, such systems ordinarily produce a curved focal surface and thus require either a curved medium or a scan angle which is small enough that the curved focal surface falls within the beam's depth of focus.

A pre-objective system can produce a flat focal surface, but this requires a complex (e.g. flat field or F-theta) lens.

By providing a post-objective scanning system with two lenses, focus can be achieved anywhere on the medium by varying the spacing between the lenses. If the scanning speed is slow, one or both lenses can be moved by a linear actuator to track the changing distance to the medium during scanning. However, as the scanning speed is increased, the frequency response of a linear actuator will eventually be exceeded.

SUMMARY OF THE INVENTION

The invention is an XY scanning system which achieves high-speed precision scanning with a resolution that enables, e.g., accurate gray-scale writing of an image; the system easily accommodates different film sizes.

A general feature of the invention is an improvement in a surface-scanning system of the kind that defines an optical path and has a scanning assembly comprised of X and Y angularly oscillating scanners for deflecting a portion of the path, and first and second optical elements aligned with stationary portions of the optical path and driven in rectilinear oscillating motion along the path to provide focus correction respectively for the X and Y scanners. The improvement is that the X direction scanner is of the resonant type and has a mechanism for dynamically tuning its resonant frequency, the first optical element is mounted to oscillate in rectilinear resonant motion, and the tuning mechanism of the X direction scanner is arranged to receive a signal representing the oscillations of the first optical element and to tune the resonant frequency of the X direction scanner to synchronize its resonant motion with that of the first optical element.

Preferred embodiments include the following features. There are multiple selectable positions, relative to the scanning assembly, along the optical path for the surface being scanned; and an optical element positioning means is provided to position the center location (through which the second optical element moves during scanning), at any one of a plurality of predetermined locations along the optical path generally to focus the scanning system in accordance with a corresponding one of the selectable positions of the surface. The first optical element is arranged to achieve focus correction with respect to motion of the X scanner, and is driven resonantly at a fixed frequency. The second optical element is arranged to achieve focus correction with respect to motion of the Y scanner, and is driven nonresonantly. An array of pixels is defined on the surface being scanned, the number of pixels in the array being the same for all of the selectable positions of the surface. The surface is a light sensitive film, the optical path carries a beam of light from a source to the surface, and the source is modulated on the basis of digital data correpsonding to an image. The digital data is grayscale data acquired in a medical procedure.

By using a resonant-type scanner, the speed of X direction can be high, while tuning the motion of the first optical element to the scanner maintains focus. Different size surfaces can be used while maintaining the same total number of pixels. The precision of the scanning and focusing enables gray-scale digital data to be used to generate, e.g., tomographic gray-scale images quickly and with high quality.

Other advantages and features of the invention will become apparent from the following description of the preferred embodiment, and from the claims.

DESCRIPTION OF THE PREFERRED EMBODIMENT

We first briefly describe the drawings.

Drawings

STRUCTURE AND OPERATION

Figure 1:
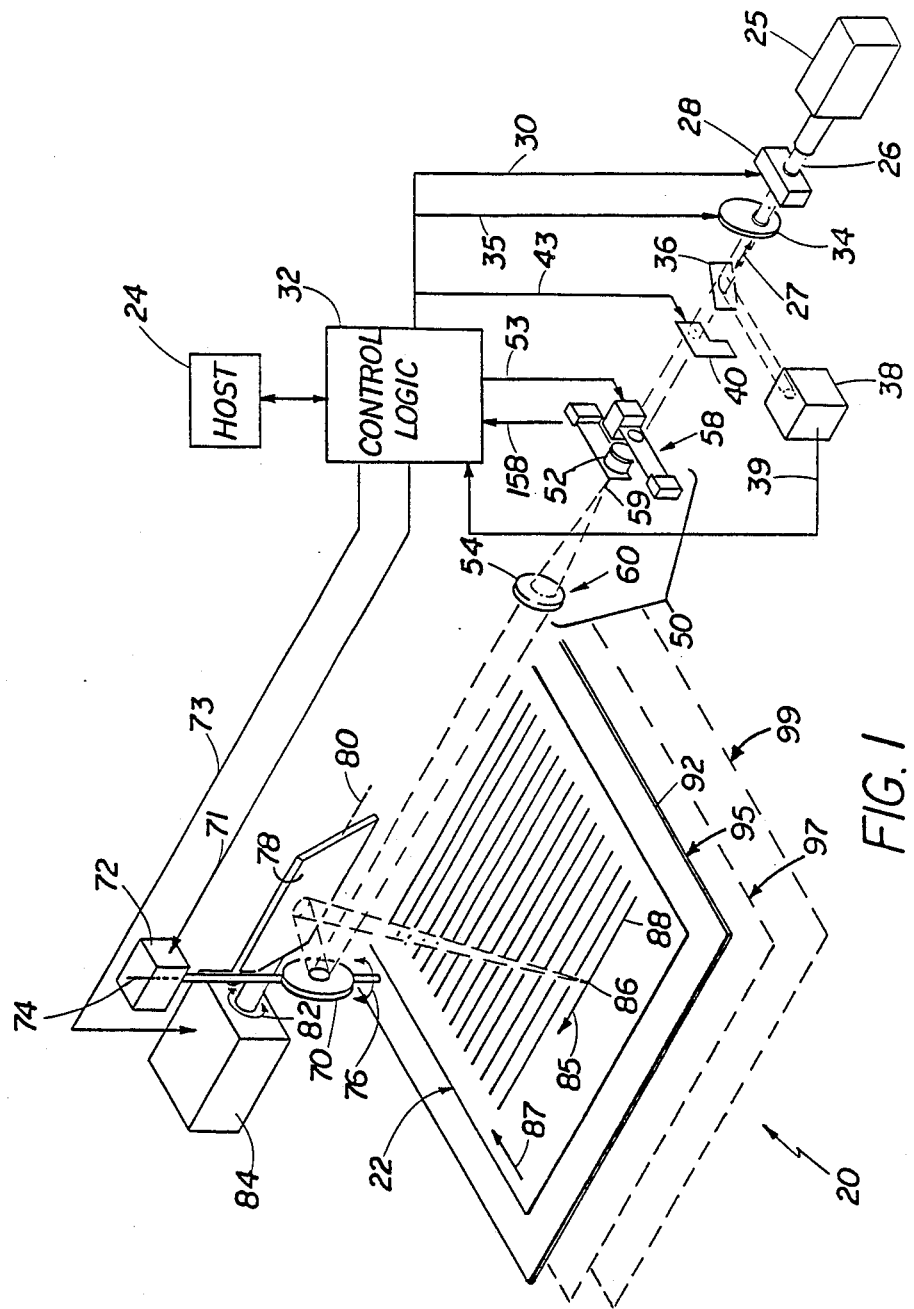
FIG. 1 is a diagrammatic perspective view of a scanning system.
Figure 2:
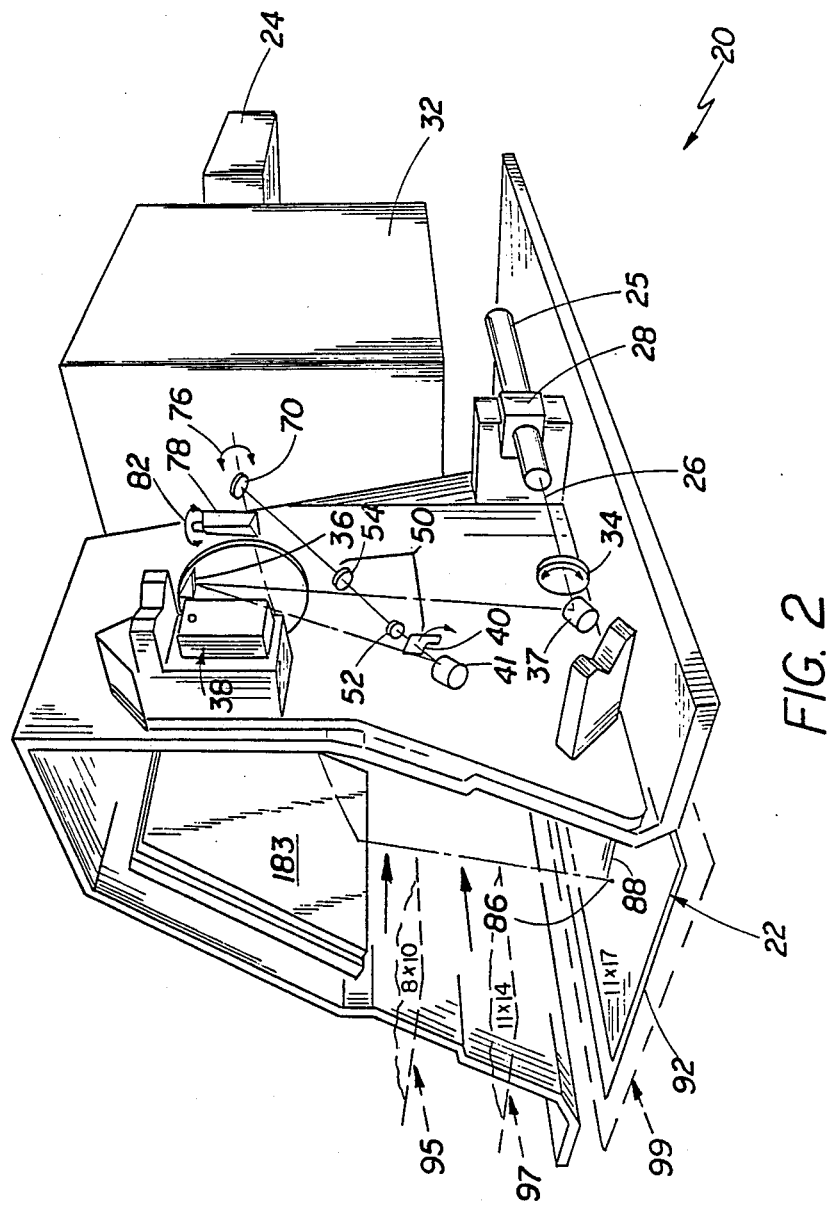
FIG. 2 is a partially diagrammatic perspective view of the scanning system showing an actual physical arrangement of optical elements.

Referring to FIGS. 1, 2, a scanning system 20 for exposing a two-dimensional gray scale X-ray like image on a sheet of film 22 in accordance with gray scale video data received from a host computer 24 includes a gas video laser 25 which emits a laser beam 26 along a beam path 27 (which begins at laser 25 and ends at film 22). An acousto-optic (A/O) modulator 28 in beam path 27 modulates the intensity of laser beam 26 based on a control signal 30 generated by control logic 32 in accordance with the video data from host 24.

Beam 26 next passes through a rotatable neutral density wheel 34. The motion of the wheel is controlled by a signal 35 from logic 32 so as to vary the intensity of beam 26, but at a much slower rate than modulator 28, to compensate for long term variations in laser power, differing film sensitivities, and differing power densities at different focal plane distances.

After deflection by a planar mirror 37 (FIG. 2), beam 26 next strikes a beam splitter 36 which directs a portion of the beam to a photo detector 38 that monitors the beam intensity and provides a corresponding feedback signal 39 to control logic 32.

The remaining portion of beam 26 continues along beam path 27 and is deflected by a planar mirror 41 (FIG. 2) to a shutter 40 which (under control of a signal 43 from control logic 32) remains open during scanning but is otherwise kept closed (thereby physically interrupting the beam) to prevent injury to the system's operators and to prevent undesired exposure of the film.

If shutter 40 is open, the beam 26 then passes through a dynamic focusing telescope 50 consisting of a fast focus lens 52 and a slow focus lens 54, which move along beam path 27 to maintain the focus of beam 26 on film 22.

Fast focus lens 52 is mounted in a lens assembly 58 (FIG. 1) for resonant motion along path 27 (driven in a manner to be described below based on a signal 53 from control logic 32) to adjust the focus of the beam as it scans across film 22 in the fast scan (X) direction. Lens 52 focuses beam 26 at a point 59 (FIG. 1) after which the beam enters slow focus lens 54.

Slow focus lens 54 is mounted in a lens assembly 60, which includes a conventional galvanometer 62 for linearly driving lens 54. An example of such a linear lens driver is shown in Montagu, U.S. Pat. No. 4,525,030, incorporated herein by reference. The motion of lens 54 along path 27 adjusts the focus to accommodate scanning of the beam in the slow scan (Y) direction. In a single scanning of the full image surface, lens 54 moves from one extreme of excursion through an adjustable center location to an opposite extreme of excursion. The center location is chosen to suit the particular focal length required by a given size film (as described below).

After emerging from lens 54, beam 26 is deflected by a fast scanner mirror 70 for scanning in the X-direction. Mirror 70 is driven by a tunable resonant scanner 72 (FIG. 1) for oscillating mirror 70 about an axis 74 (as indicated by arrows 76). Scanner 72 has a tunable frequency range of between about 198 Hz and 202 Hz. The operation of scanner 72 (including its frequency) is controlled by signal 71 from control logic 32.

The beam is then deflected by a slow scan mirror 78 for scanning in the Y direction. Mirror 78 is rotated (as indicated by arrows 82) about an axis 80 by a conventional galvanometer 84. Axis 80 is perpendicular to axis 74. Mirror 78 moves much more slowly than mirror 70, rotating through its range of motion only once for each sheet of film 22 and only in a single direction (i.e. in the Y direction from one end of film 22 to the other as indicated by arrow 87, FIG. 1).

Finally, the deflected beam is reflected by a planar mirror 183 (FIG. 2) and strikes film 22 as a circular image spot 86 (FIG. 1).

Thus, the beam is scanned in the X and Y directions across film 22 to form an exposed image comprising an array of focused pixels, the intensity of the pixels corresponding to the gray scale data received from host 24.

Figure 3A:
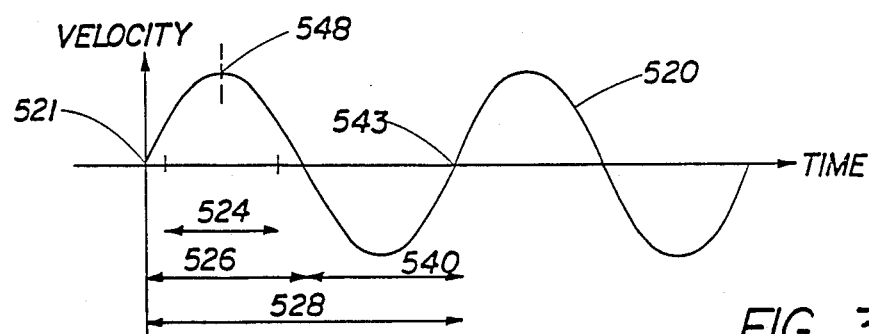
FIG. 3A is a graph of the sinusoidal motion of the X-scanner of FIGS. 1, 2.
Figure 3B:
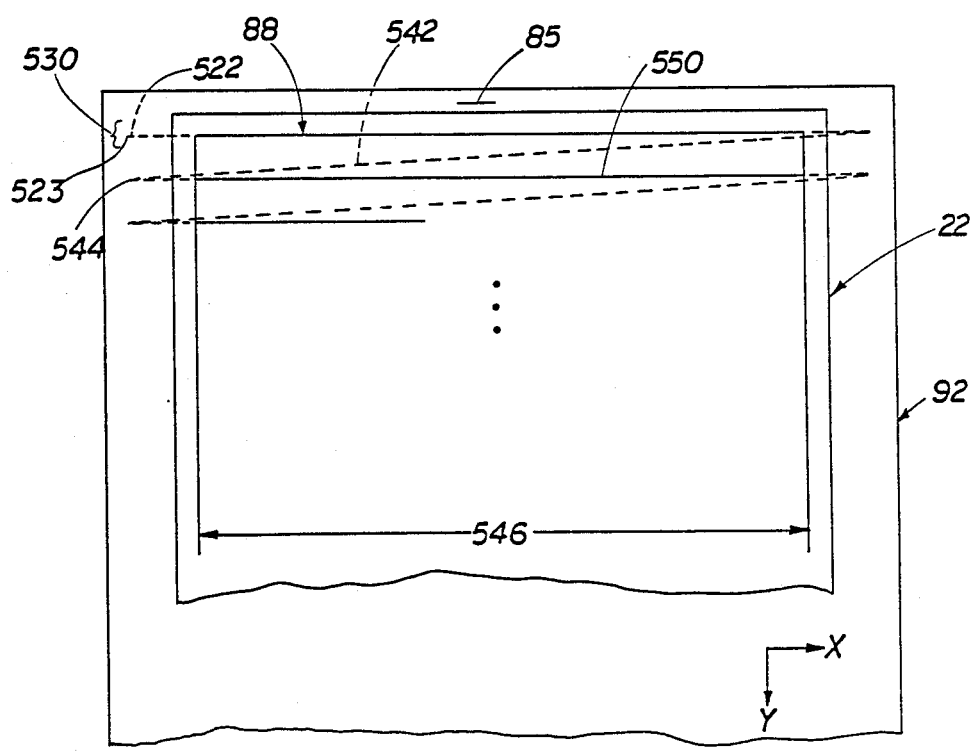
FIG. 3B is a diagram of the path of the beam of FIGS. 1, 2 across a film.

Referring to FIGS. 3A, 3B, curve 520 represents the sinusoidal velocity imparted by resonant scanner 72 to scanner mirror 70 and line 522 represents the corresponding path of beam 26 back and forth across film 22. (Point 521 on curve 520, for eample, corresponds to location 523 on line 522.) For a predetermined portion 524 of the first half 526 of each cycle 528 of resonant scanner 72 (corresponding to the forward trace 530, FIG. 3B) beam 26 is in focus and spot 86 (FIG. 1) is deflected in a line (in the direction of arrow 85, FIG. 3B) to form a row of exposed spots making up a scan line 88 (shown in solid line); during the second half 540 of each cycle of scanner 72 (i.e. the retrace, dotted line 542, FIG. 3B) mirror 70 moves the beam back in the X direction across the film so that at the beginning of the next forward half cycle of scanner 72 (point 543 on curve 520) the spot is repositioned at the beginning 544 of the next scan line; during the retrace, beam 26 is out of focus and modulator 28 is set by control logic 32 to interrupt the beam so the film is not exposed.

During both forward trace and retrace, mirror 80 moves the beam at a substantially constant velocity in the Y direction. Thus, although FIG. 3B suggests that no Y direction motion occurs during the forward trace and all Y direction motion occurs during retrace, in fact each trace line and retrace line follows a slightly sinusoidal path that is imperceptibly different from a straight line path, because the spacing of the lines is ony approximately 1/9000 of their length.

Thus, only a portion (e.g., as represented by solid line 88) of each forward trace 530, corresponding to a portion 524 of cycle 528, is used for exposing film 22; the region containing the utilized portions of all traces 530, i.e. the region where film 22 is exposed, is termed the active region 546 of film 22 and corresponds to nearly the full width of film 22.

The portion 524 of each cycle 528 of scanner 72 is approximately 33 percent of the cycle and is centered about the point of peak velocity 548 and corresponds to the center 550 of each scan line and to the maximum velocity of scanner mirror 70.

Figure 4:
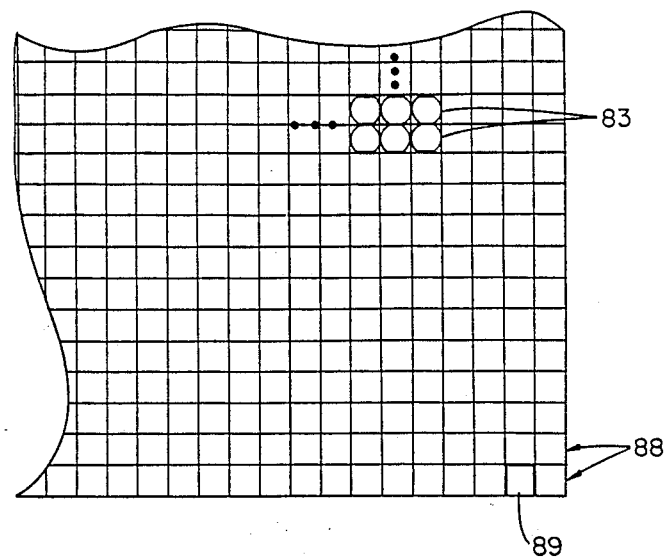
FIG. 4 is a diagram of the layout of pixels on the film.

Referring to FIG. 4, the active region of film 22 can be viewed as being divided into a grid of 4436 (X direction)×5398 (Y direction) square pixels 89.

As spot 86 moves across each scan line 88 an image spot 83 is formed, centered upon each of the pixels.

Figure 5:
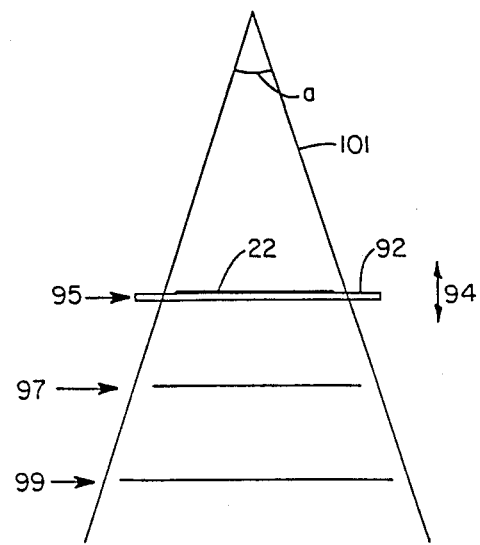
FIG. 5 is a diagram of the beam scanning cone and three positions of the film.

Referring to FIG. 5 (and again to FIGS. 1, 2), X-ray film 22 rests on a table 92 which may be located at to any one of three positions 95, 97, 99; thus system 20 can accommodate three different film sizes: 8×10 inches, 11×14 inches, and 14×17 inches. Cone 101 represents the available scanning angle "a" (approximately 15 degrees) provided by scanner 72; each of the three table positions 95, 97, 99 is chosen so that the active region 546 of each of the three corresponding sizes of film occupies the same percentage of the cone's available scanning arc.

Consequently all three different size films contain the same number (i.e. 23,945,528) of pixels; however, the sizes of the pixels for the three film sizes are different; the smallest film, 8×10 inches, has pixels 43 micrometers across; the next larger film, 11×14 inches, has pixels 59 micrometers across, and the largest film, 14×17 inches, has pixels 75.5 micrometers across.

Figure 6:
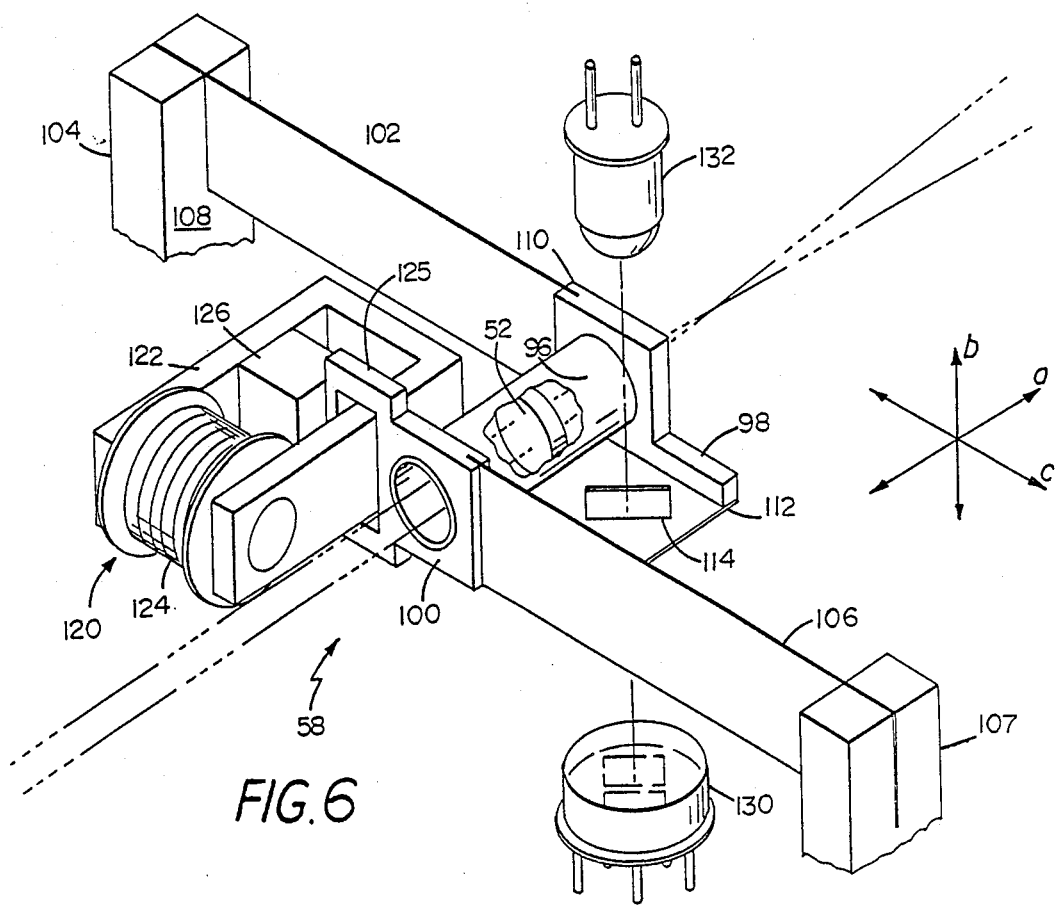
FIG. 6 is a perspective view of the fast focus lens assembly of FIGS. 1, 2, partially broken away.

Referring to FIG. 6, lens assembly 58 includes lens 52 mounted in a tubular housing 96 attached to frame members 98, 100. A rectangular hardened and tempered blue steel spring flexure 102 extends from frame member 98 to an aluminum support post 104; a similar spring flexure 106 extends from frame member 100 to a support post 107. Support posts 104, 107 are both mounted on a base (not shown) that is fixed relative to the image surface. Flexures 102, 106 are each 0.0079 inch thick, 0.300 inch wide, and have an active length (e.g. from surface 108 of support post 104 to surface 110 of frame member 98) of 0.933 inch. Together, lens 52, housing 96, and flexures 102, 106 form a spring system having a resonant frequency of 200 Hz.

A plate 112 connects frame members 98, 100 and includes a rectangular diagonally positioned (with respect to beam path 27) slot 114.

Lens 52 is caused to oscillate resonantly to maintain the focus of the beam on film 22 in conjunction with scanning in the X direction; the oscillation alters the spacing between lens 52 and lens 54, thereby changing the focal length of the lens system.

Forces to sustain oscillation of lens 52 are supplied by inductive drive 120 of a kind described in Montagu, U.S. Pat. No. 4,502,752, incorporated herein by reference; drive 120 includes a transformer core 122 of high permeability magnetic material on which is wound AC drive coil 124. A single conductive ring 125 of support frame member 98 surrounds transformer core 122 opposite a permanent magnet 126. Magnet 126 supplies a constant magnetic field across the air gap to conductive ring 125. An AC current is induced in ring 125 by transformer core 122 in response to an AC current signal in coil 124, and the resulting alternating force that is developed in ring 125 drives lens 52 in resonant oscillation on flexures 102, 106.

Lens 52 is located midway between flexures 102, 106 and, during operation, the deflection of the flexures in a direction parallel to beam path 27 moves lens 52 in a substantially straight line (there is also a slight rotation—less than one half degree—but it does not significantly distort the beam spot 86 on film 22).

The motion of lens 52 is monitored by a dual photodiode sensor 130 which receives radiation from an LED 132 that passes through slot 114, thus providing a lens position signal 55 (FIG. 1) to control logic 32.

Figure 7:
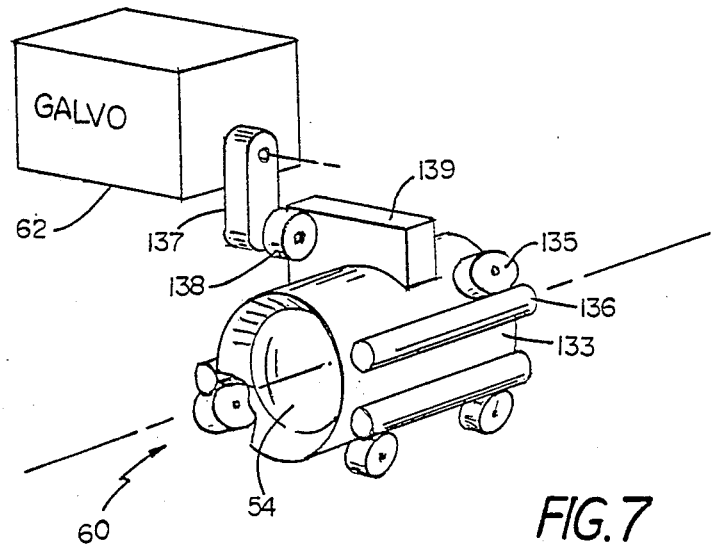
FIG. 7 is a perspective view of the slow focus lens assembly of FIGS. 1, 2.

Referring to FIG. 7, in lens assembly 60, lens 54 is mounted in a tubular housing 133 between two lens screws 134 (not shown).

Ball bearings 135, rotatably attached to housing 133, allow the housing to move back and forth along corresponding fixed guide rails 136. Guide rails 136 are in turn attached to a frame (not shown) that is fixed relative to the image surface.

Lens 54 is driven back and forth along rails 136 by galvanometer 62 whose rotational motion is translated to linear motion of the housing and lens via a crank 137 and a ball bearing 138 rotatably attached to the crank and to a support 139 (attached to housing 133).

The motion of galvanometer 62, and thus lens 54, is controlled by a signal 61 from control logic 32 (FIG. 1) using a position feedback signal 63 from a capacitive sensor (not shown) within the galvanometer.

Figure 8:
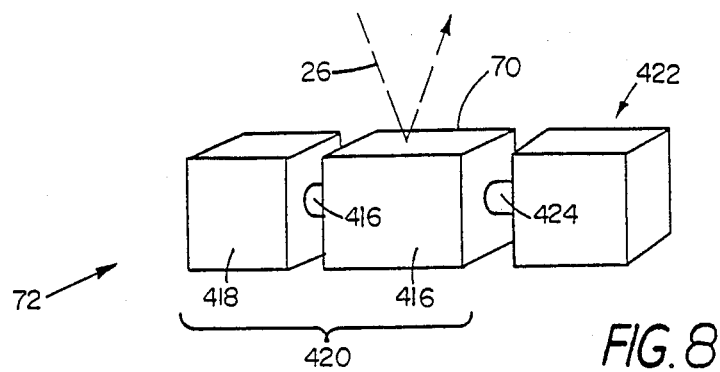
FIG. 8 is an isometric schematic view of a tunable resonant device.

Referring to FIG. 8, tunable resonant scanner 72 includes a rotatable mechanical suspension 412 (e.g., a flexural suspension of the kind available under the name Flexure Bearings from Bendix Corp.) which holds mirror 70 (shown schematically in FIG. 8) for scanning beam 26. The axis of rotation of suspension 412 is colinear with a shaft 416 that is driven by a conventional rotating actuator 418 (e.g., such as is disclosed in U.S. Pat. No. 4,090,112 and U.S. Pat. No. 4,076,998, incorporated herein by reference). Actuator 418 includes angular position or velocity sensors (not shown) that enable operation of suspension 412 and actuator 418 as either a directly driven or a feedback controlled resonant system 420. System 420, like all resonant systems, has a characteristic resonant frequency of operation based on the inertia (I) of its moving elements and the spring constant (K) of the suspension 412.

In order to maintain or track a selected operating resonant frequency, scanner 72 is provided with a resonance tuner 422. The tuner establishes a selectable degree of shift in the spring rate of the system, thus enabling continuous, dynamic tuning of the resonant frequency. Tuner 422 is tied to suspension 412 by a rotating shaft 424, colinear with shaft 416.

Figure 9:
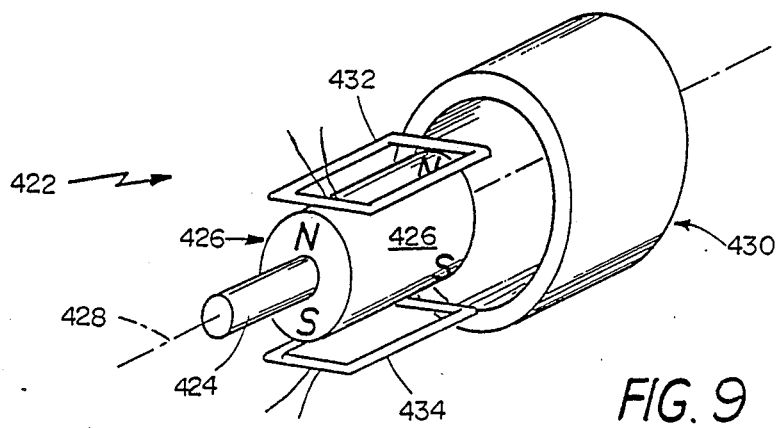
FIG. 9 is an isometric view, exploded, of the tunable element of the device of FIG. 8.

Referring to FIG. 9, within tuner 422, shaft 424 is attached to a co-axially located cylindrical permanent magnet 426 having its magnetization oriented along a diameter perpendicular to the axis of rotation 428. Magnet 426 is made from a strongly anisotropic material with high coercive force, e.g., a rare earth metal.

A hollow, low carbon steel cylindrical shell 430 concentrically surrounds magnet 426 and is held in a fixed rotational position relative to suspension 412. (In FIG. 9, shell 430 is shown pulled away from the magnet.) One of its functions is to enhance the magnetic field in the coil region.

Two coils 432, 434 respectively lie entirely within the North (N) and South (S) magnetic fields of magnet 426.

Figure 10:
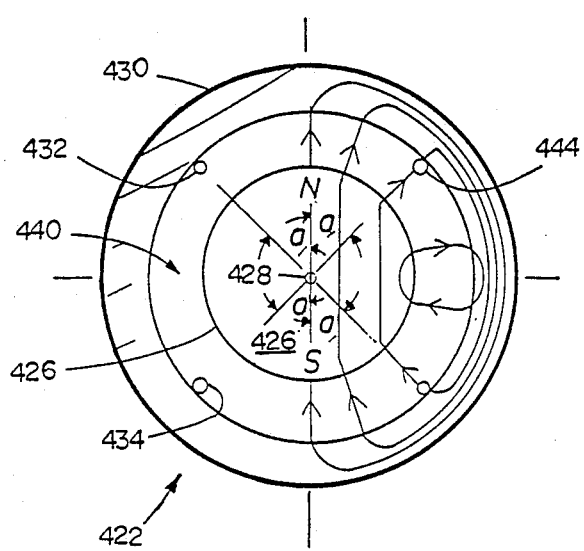
FIGS. 10, 11 are diagrammatic end views of the tunable element of the device of FIG. 8, in two different angular positions, respectively.

Referring to FIG. 10, when magnet 426 is in its central rotational position (corresponding to the central rotational position of suspension 412), the two segments of coil 432 evenly straddle the N pole, and the two segments of coil 434 evenly straddle the S pole, with angles a all being approximately 45°. Coils 432, 434 are both attached to the inner wall of shell 430.

The magnetic field (B) in the air gap (g) 440 between magnet 426 and shell 430 at the location of a segment 444 of coil 432 has a value $$B = K\, B_r \cos\theta$$

that depends on the angle $\theta$ between the axis of the magnet and the diameter on which segment 44 lies (i.e. 45°). $B_r$ is a constant residual inductance of magnet 426, and K is a non-dimensional constant (typically between 0.5 and 1) that depends on the geometry and particular magnetic material chosen as well as the conditions of shell 430.

Figure 11:
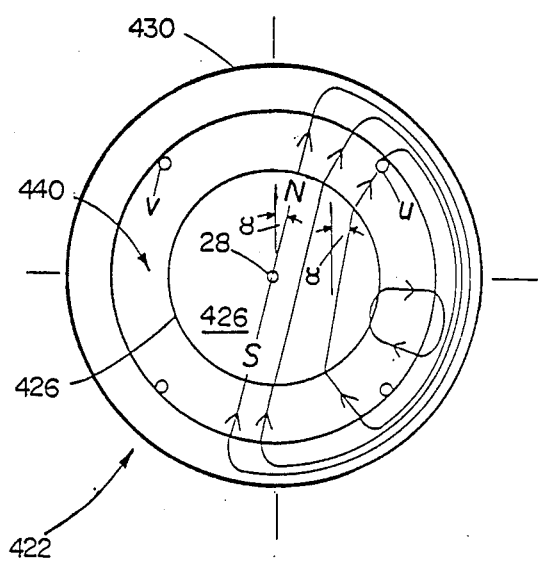

The torque constant for the two coil device (including coil 434) can be defined as $T/\gamma$ where $\gamma$ is the angle (FIG. 11) through which magnet 426 has rotated relative to coils 432, 434:

$$T/\gamma = 1.414\, K\, B_r L\, N\, I\, d$$

Where I is the current.

For example, in a scanner with a 200 Hz resonant frequency, an armature with total inertia of 2.5 gm-cm$^2$ and a suspension wih a spring constant of 3,790,000 dy-cm/rad, the tuner could have the following parameters:

d = 0.9 cm
g = 0.4 cm (the gap)
N = 175 turns/coil
L = 1 cm (the length)
$B_r$ = 1.1 tesla
K = 0.5, approximately Such a tunable resonant scanner 72 is described in U.S. patent application Ser. No. 893,481, filed Aug. 8, 1986, incorporated herein by reference.

Figure 12:
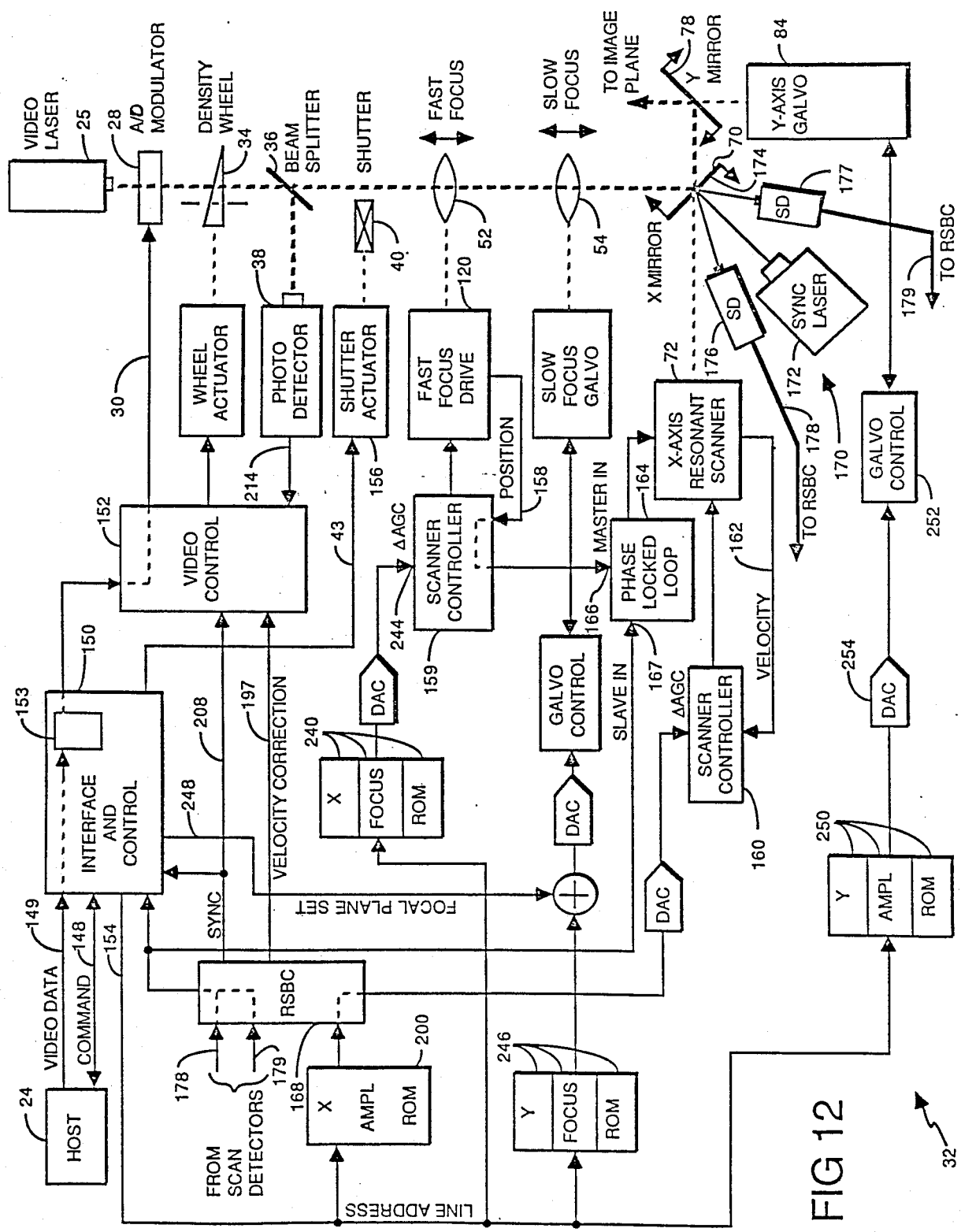
FIG. 12 is a block diagram of the control logic of FIG. 1.

Referring to FIG. 12, control logic 32 receives the digital gray scale video data and associated commands from and returns status information to host computer 24 (on lines 148, 149) and controls the components of scanning system 20 to deliver the video data to the film 22.

The received video data passes through an interface and control circuit 150 to a video control circuit 152 (a small buffer 153 of video data is maintained in interface and control circuit 150 to ease host data rate requirements) which in turn generates modulator data, corrected for various non-linearities occurring in system 20, to drive the modulator 28. The non-linearities include the non-linearity of the film (because linear changes in exposure—beam intensity—result in non-linear changes in optical density), the continuous variation in beam velocity across the scan line, and the non-linear transfer characteristic of A/O modulator 28.

Interface and control circuit 150 also generates a line address signal 154 representative of the beam's vertical position (i.e. the index of the current scan line). Signal 154 changes at the beginning of each scan line and serves as the input to several other components of control logic 32 (further described below). Interface and control circuit 150 also directly controls shutter 40 via a shutter actuator 156.

All the components of scanning system 20 are synchronized to the motion of fast focus lens 52; in control logic 32 this motion is manifested as position feedback signal 158 from fast focus drive 120 which is proportional to the motion of lens 52. Using feedback signal 158, analog scanner controller amplifier 159 maintains the oscillation of lens 52 at its resonant frequency by controlling drive 120; controller 159 also maintains a constant amplitude of the oscillation of lens 52.

The amplitude of resonant scanner 72 is controlled in a similar fashion; scanner controller amplifier 160 uses feedback signal 162, proportional to the velocity of scanner 72, to maintain constant amplitude of motion of the resonant scanner 72.

Unlike the fast focus lens, however, the resonant frequency and phase of scanner 72 is tunable (described above) and is locked to the frequency and phase of sinusoidal feedback signal 158. This is accomplished by using signal 158 (converted to a digital signal by clipping) as the master input 166 to phase locked loop 164 which generates a delta frequency signal indicative of the difference between the current phase/frequency of scanner 72 and the phase/frequency of lens assembly 58. A digital position signal 167 generated by resonant scanner beam clock (RSBC) 168 (described below) is the slave input to loop 164 and is representative of the phase/frequency of scanner 72.

RSBC 168 derives signal 167 from a second laser subsystem 170 which includes semiconductor diode synchronization laser 172 reflected by the rear surface of mirror 70. Two scan detectors 176, 177 are positioned so that when mirror 70 deflects beam 26 to positions near either end of scan line 88 (outside the active region of film 22, but before beam 26 reaches the extreme end of its range of motion—as indicated by cone 101, FIG. 5) the reflected synchronization laser beam will cross one of detectors 176, 177 causing it to send a pulse signal to RSBC 168 over one of two signal line pairs 178, 179. As beam 26 begins its return trip the synchronization laser beam again crosses the same scan detector, causing it to send a pulse signal over the other one of the two line pairs 178, 179. Thus, for each cycle of scanner 72, four pulse signals are sent to RSBC 168; collectively, the four pulses generated by detectors 176, 177 during a cycle of scanner 72 provide the RSBC with sufficient information to calculate the precise amplitude, frequency and phase of the motion of scanner 72.

Figure 13:
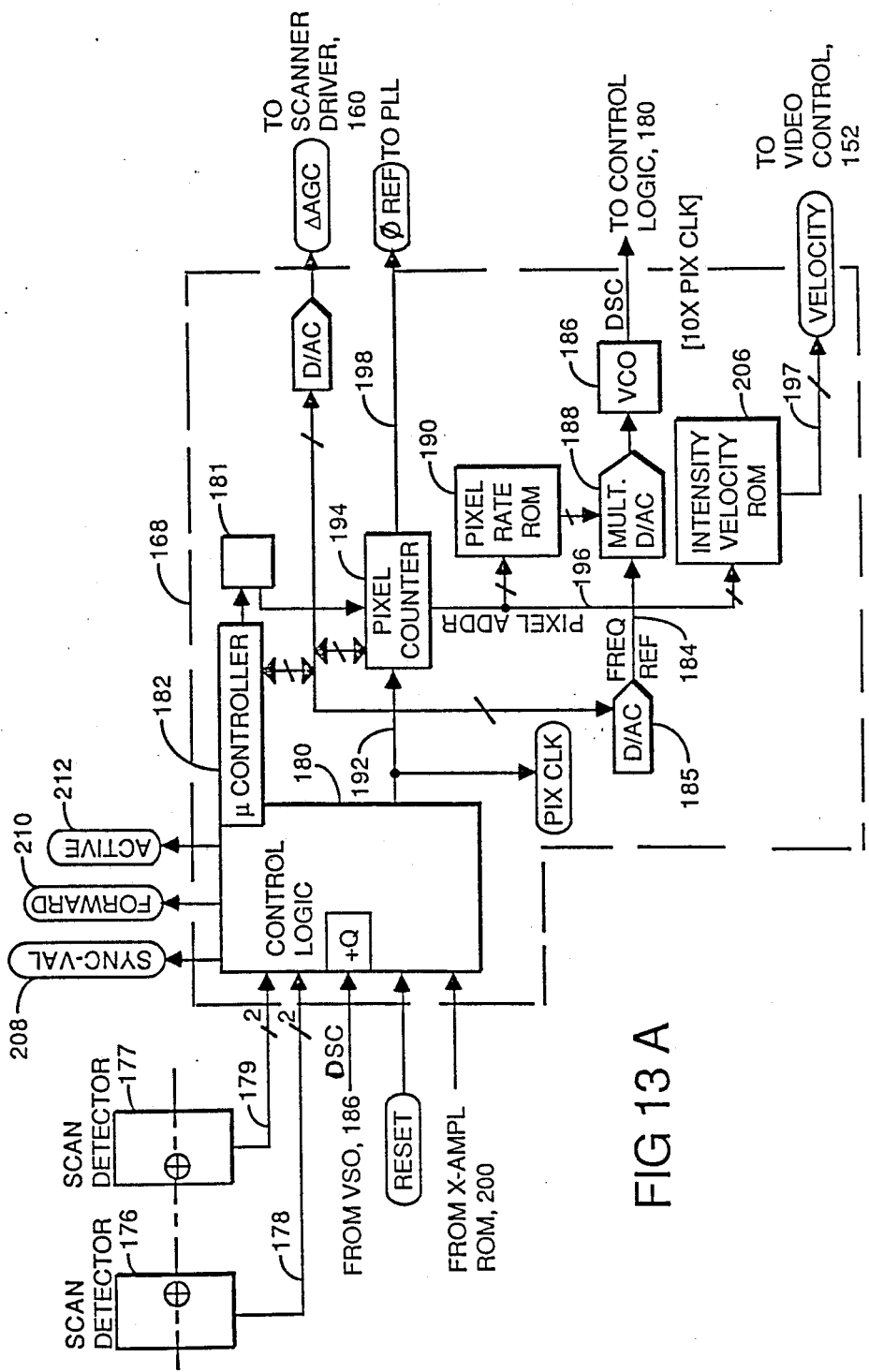
FIG. 13A is a block diagram of the resonant scanner beam clock of FIG. 12.
FIG. 13B is a graph illustrating the relationship of the frequency of the VCO of FIG. 13 to the frequency of the X-scanner.
Figure 13:
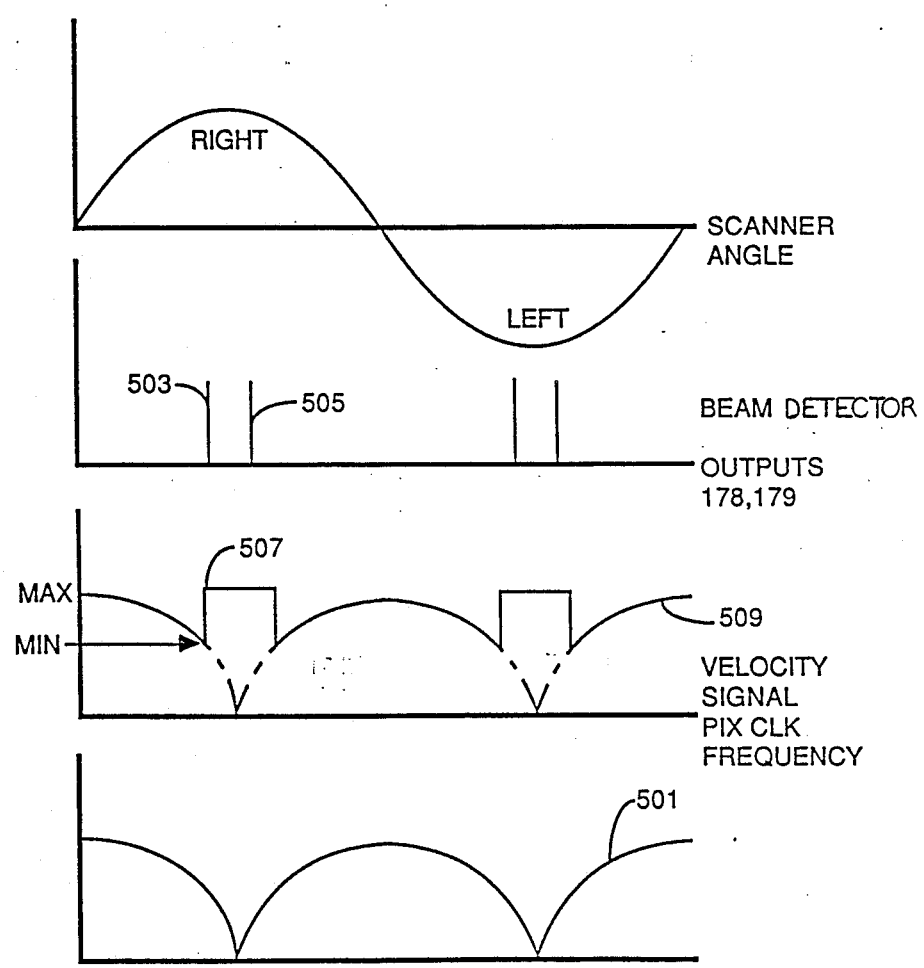

Referring to FIG. 13A, RSBC 168 provides correction for two effects found in a scanning system such as the present invention which, left uncorrected, would distort the image produced on film 22. The first effect is the variation in the velocity of the beam spot along a scan line 88 caused by the sinusoidal motion of scanner 72. The ratio of the velocity of beam spot 86 at the center of scan line 88 to the velocity at either end of the scan line is nearly 2:1. The second effect is the geometric distortion caused by the use of a two mirror system and flat image plane. Both effects must be corrected if the pixels (and thus the image spots) composing the gray scale image are to be evenly spaced along each scan line.

The velocity variation effect, left uncorrected, causes two different types of distortion. First, if the time duration of pixels were constant across scan line 88, the variation in velocity would cause the pixels to be of differing sizes, with those nearest the center being widest. Second, if the intensity of the beam (for any given desired optical density) were constant across the scan line, then the amount of exposure of any given pixel would vary inversely with the velocity of the beam across that pixel, i.e. if the beam moves more quickly over pixel A than over pixel B, but has the same intensity for both pixels, more light energy will be delivered to pixel B.

RSBC corrects both velocity distortion effects on a pixel-by-pixel basis in real time, i.e. as the beam 86 moves from one pixel to the next across scan line 88. To correct for the first (pixel size distortion) the time duration of each pixel is adjusted depending on its position along scan line 88 (and thus the velocity of spot 86). The second (intensity distortion) is corrected by adjusting the intensity of each pixel depending on its position along scan line 88 (and thus the velocity of spot 86 across it).

Because both these velocity related effects are the same for every scan line, predetermined adjustment values calculated for each pixel in scan line 88 can be used.

The predetermined adjustment values are stored in two read only memories (ROMs), pixel rate ROM 190 (which contains the adjustment values for the size distortion) and intensity-velocity ROM 206 (which contains the adjustment values for the intensity distortion) with each addressable location of the ROMs containing the adjustment values for one pixel position. To read the adjustment values for any given pixel the address of that pixel (i.e. its position along the scan line) is applied to the address inputs of the ROMs.

The current position of the beam along the scan line is maintained by pixel counter 194 and appears as digital pixel address signal 196. Pixel counter 194 changes pixel address 196 each time a pixel clock 192 pulse occurs. Thus after each pixel is generated the current pixel address is incremented and applied to the ROMs to yield the adjustment values for the next pixel.

The adjustment values from pixel rate ROM 190 indicate, for each pixel, the time duration of that pixel, and thus the time interval until the next pixel clock pulse. The adjustment values from pixel rate ROM 190 are one input to multiplying digital-to-analog converter (DAC) 188. The output of DAC 188 controls the frequency of voltage controlled oscillator (VCO) 186. The other input to DAC 188 is digital frequency reference signal 184 (converted to a reference voltage by DAC 185). Signal 184 is determined by a microprocessor 182 (i.e. an Intel 8048) to maintain the average frequency of VCO 186, as a given multiple of the frequency of scanner 72, using the synchronization pulses received from scan detectors 176, 177 (which, as noted above, fully specify the phase/frequency of scanner 72) to measure the average frequency of VCO 186 (the VCO specifies the "time" when the synchronization beam crosses a detector).

The output of VCO 186 is fed back to control logic 180 which divides the frequency by Q (10) to form pixel clock pulse stream 192.

The output of VCO 186 in coordination with the pulses from the scan detectors is also used to reset the pixel counter 194 (i.e. pixel address 196) at the beginning of each scan line.

At the end of each retrace, when the synchronization beam crosses the scan detector, microprocessor 182 calculates and stores in hardware register 181 an address to be loaded into the pixel counter when the synchronization beam next crosses the scan detector at the beginning of the forward trace (i.e. the beginning of the next scan line). When the detector is crossed the second time the address stored in register 181 is loaded into the pixel counter.

Referring to FIG. 13B, it is desirable that the "time" of the detector crossings, and thus the position of the beam, be determined very accurately. The accuracy with which the position of the beam can be determined directly affects the accuray of pixel position and size on film 22; these two factors in turn affect the geometric accuracy of the gray scale image produced.

Because the frequency of the output of VCO 186 is approximately ten times the frequency of the pixel clock the "time" when the synchronization beam crosses the detectors can be determined very accurately; the position of beam 26 can be determined to within one-tenth of a pixel width.

Because the frequency of VCO 186 is synchronized to the velocity of scanner 72 the frequency of VCO 186 is highest at the center of each trace and would be near its lowest at the scan detector crossings 503, 505 (and thus measurement resolution would be reduced).

It is is not, however, required that the VCO 186 be frequency modulated while beam 26 is outside the active region of film 22. Soon after beam 26 leaves the active region (at 507 on graph 509) the VCO frequency 509 is increased to its maximum resolution of timing of the scan detector crossings.

Referring again to FIGS. 12, 13A, the adjustment values read from intensity-velocity ROM 206 are passed to video control circuit 152 (described below) as digital velocity correction signal 197.

Counter 194 also generates reference signal 198 representative of the phase/frequency of scanner 72 derived from the scan detector pulses. Reference signal 198 is the slave input to PLL 164 and a control input to interface and control electronics 150.

RSBC 168 accomplishes correction of the tangent geometric effect by reading, for each scan line, X-direction scanner amplitude correction values from an X amplitude ROM 200 and sending them via a DAC to delta amplitude input 202 of scanner controller 160. While the basic control loop consisting of resonant scanner 72, scanner controller 160, and velocity feedback signal 162 provides coarse control of amplitude variations of scanner 72, RSBC 168 also imparts a fine control by making minor modifications to the amplitude correction values based on the received scan detector pulses before sending the correction values to scanner controller 160.

RSBC also produces status signal Sync-Val 208 which remains "true" as long as system 20 remains in synchronism but becomes "false" when loss of synchronism is detected. Another signal, Forward 210, is "true" when the beam motion is from left to right, i.e. when a scan line is being written. A third signal, Active 212, is "true" while the beam is in the active region of each forward scan.

Figure 14:
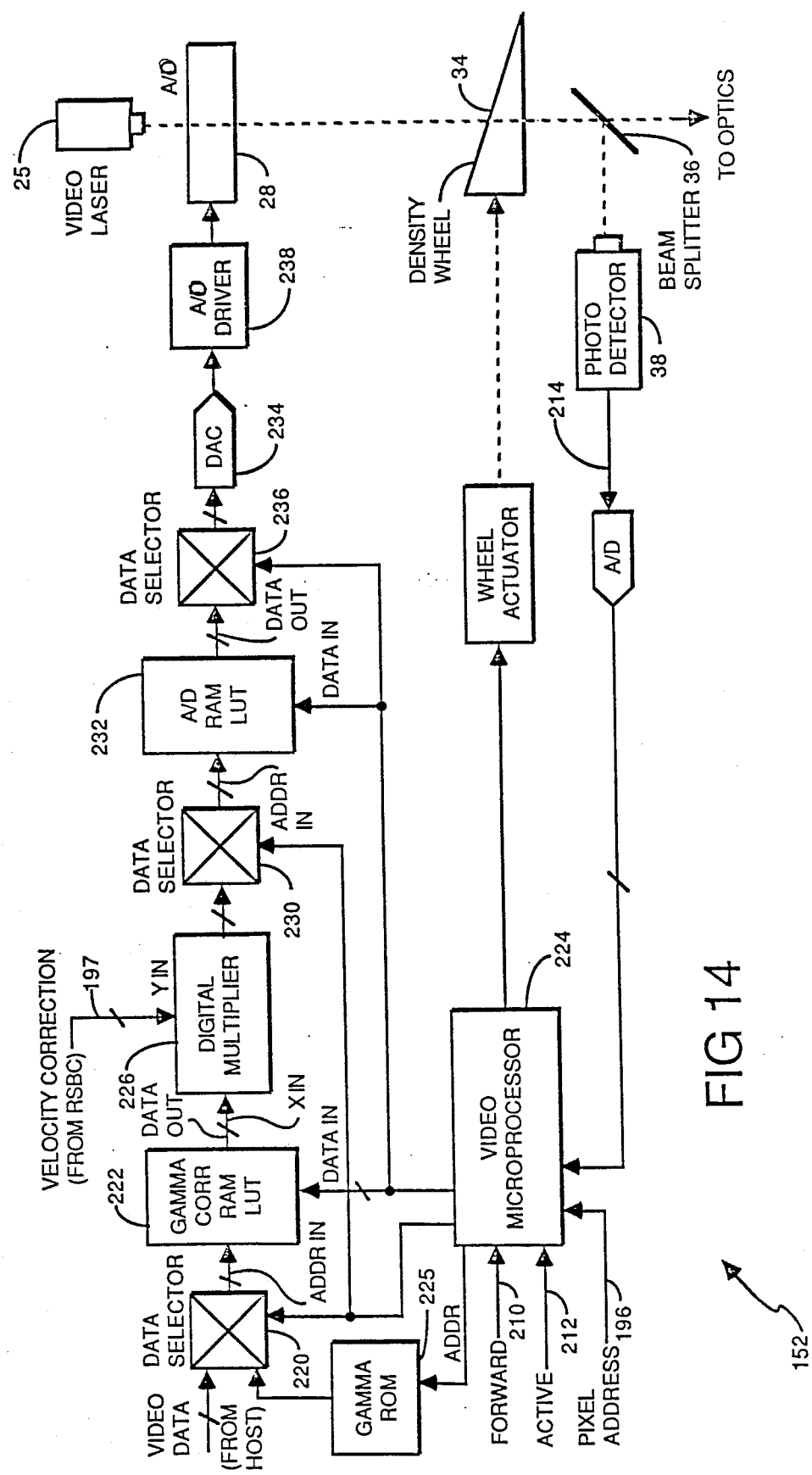
FIG. 14 is a block diagram of the video control circuit of FIG. 12.

Referring to FIGS. 12 and 14, video control circuit 152 receives, as inputs, gray scale video data from interface and control electronics 150, and intensity signal 214 (representative of the laser beam intensity) from photo detector 38. Using these signals circuit 152 controls A/O modulator 28 and wheel actuator 225 of density wheel 34 to modulate the beam in accordance with the video data.

The video data received at data selector 220 of circuit 152 cannot be used directly to control modulator 28.

One reason is that video data values are to be proportional to optical density on the film, while the film is a non-linear medium. Therefore, the video data must be transformed to match the particular exposure characteristics of the film being used. This is accomplished by loading a Gamma correction RAM (semiconductor random access memory) lookup table (LUT) 222 with values from a given type of film's Gamma curve (a function expressing the non-linear relationship of exposure to density) and applying the video data as addresses to LUT 222. (LUT 222 is loaded by a video microprocessor 224 from Gamma ROM 227, via data selector 220 and the data inputs of LUT 222.) The data at the output of LUT 222 is thereby corrected for the film's non-linear exposure characteristics.

A second reason is the changing beam velocity along each scan line and the consequent variation in the length of exposure time among the pixels on the scan line. Because the beam is moving faster at the center of the scan line than at either end the length of exposure time near the center, without correction, would be much shorter than at the ends. This effect is corrected by digitally multiplying the data from LUT 222 by values 197 from the intensity-velocity ROM 206 (FIG. 13) in real time on a pixel-by-pixel basis in digital multiplier 226.

A third and final correction adjusts the video data to take account for the non-linear transfer characteristic of the A/O modulator 28. The data from multiplier 226 passes through a second data selector 230 into the address inputs of A/O RAM LUT 232 which has been loaded with the appropriate transformation values (by microprocessor 224 via data selector 230). During scanning the data outputs of A/O LUT 232 are sent to DAC 234 (via data selector 236) which controls A/O driving circuitry 238 which, finally, drives A/O modulator 28.

The transformation values loaded into A/O LUT 232 are not loaded from a ROM as were the Gamma correction values; instead they are dynamically generated prior to the printing of each sheet of X-ray film. To generate the values, microprocessor 224 uses data selector 236 to send values directly to DAC 234 while measuring the resulting changes in beam intensity via photo detector 38. From these measurements of A/O modulator 28 performance, microprocessor 224 calculates and loads the appropriate transformation values into A/O LUT 232.

Microprocessor 224 can also make coarser, slower adjustments to the beam intensity by controlling density wheel 34; by varying the attenuation of beam 26 the microprocessor can compensate for decreases in laser power due to laser aging or dirty optical components, intensity variations caused by operating point drift of A/O modulator 28 and driver 238, different film sensitivities, and the different power densities required for different sizes of a single film type (i.e. while all of the different sizes of one type of film may have the same Gamma curve, adjustments must still be made for different focal plane distances).

Referring again to FIG. 12, the amplitude of the motion of lens 52 must be adjusted as the beam moves down the page (in the Y direction) to partially correct the flat field focus tangent effect. This is accomplished by applying line address 154 to one of three X-focus ROMs 240 (one for each of the three possible different focal plane distances). The data from the ROM (passed via a DAC) determines the ΔAGC input 244 to scanner controller 159 of drive 120.

The position of lens 54 is similarly adjusted through use of one of three Y-focus ROMs 246. The data from each ROM is not used directly but is instead added to focal plane set signal 248, which specifies the center location for each of the three focal planes. (While the focal plane set value could be incorporated in ROMs 246, that would require more more storage.)

Finally, the position of mirror 78 is also controlled on a line by line basis using one of three (one for each film size) Y-amplitude ROMs 250 having line address 154 as their address input. The correction values are applied to galvanometer controller 252 via DAC 254.

Figure 15:
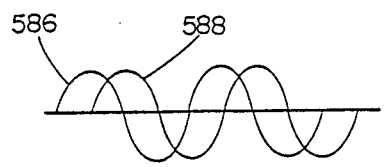
FIG. 15 is a graph illustrating the relationship between the motion of the X-scanner and the motion of the fast focus lens.
Figure 16:
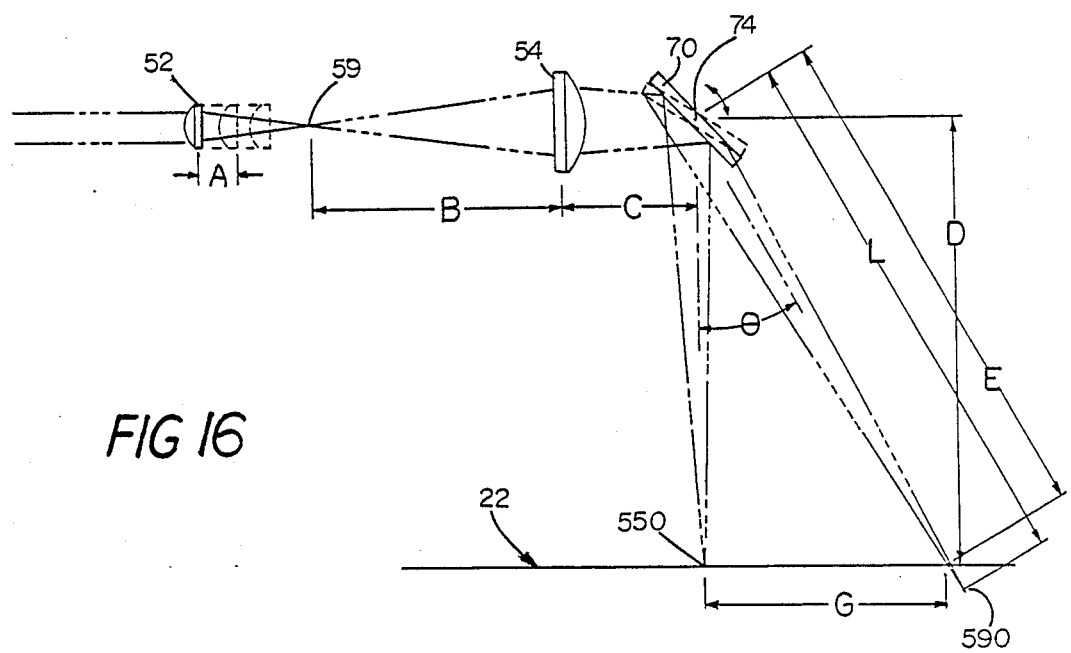
FIG. 16 is a diagrammatic view of the fast focus and slow focus lenses, the X-scanner, and the film of FIGS. 1, 2.

Referring to FIG. 15, the resonant sinusoidal motion of fast focus lens 52 is indicated by line 586, and the synchronized (but 90° out of phase) sinusoidal motion of scanner mirror 70 is indicated by line 588. Thus, referring to FIG. 16, when scanner mirror 70 is in its central or neutral position (as indicated in solid lines), fast focus lens 52 is at its maximum spacing (A) from lens 54, as indicated in solid lines, and the beam spot 86 is at the center of a scan line 88. Lens 52 oscillates sinusoidally and the location of beam spot 86 results fro the interaction between the motion of lens 52 and lens 54.

Scanner mirror 70 is rotated over an angle of about 15 degrees with about 13 degrees of the mirror deflection being used for the scan in direction 85 to produce scan line 88. Film 22 is located 76.4 centimeters from the axis 74 of mirror 70 (dimension D) and lens 54 is located 86 millimeters from axis 74 (dimension C). When lens 52 is in its rest (mid) position, dimension B is 99.45 millimeters. The length of a scan line 88 is approximately thirty-five centimeters.

The equation for simple harmonic motion is:

$$x = A*\cos(\omega*t + \delta) \quad (1)$$

where x is the position of lens 52, measured from the rest position, A is the maximum amplitude of x, $\omega$ is $2*\pi$ times the resonant frequency, and $\delta$ is the phase shift expressed in radians.

The position of the spot 86 is given by:

$$G = D*\tan(Om*\cos(\omega*t + \delta)) \quad (2)$$

where G is the position of the spot 86, measured from the center 550 of scan line 88, and Om is the maximum optical angle of mirror 70, measured from center 550.

If H is the distance from lens 54 to spot 86, then:

$$H = E + C = D/\cos(Om*\cos(\omega*t + \delta)) + C \quad (3)$$

where E is the distance from mirror 70 to the spot 86 on the image plane.

If J is the distance from the lens 54 to the point of best focus 590, then:
$$J = B*f/(B - f) \quad (4)$$

where f is the focal length of lens 54.

If K is the value of B when x=0, then:

$$B = x + K \quad (5)$$

Substituting equation 5 into equation 4:

$$J = (x + K)*f/(x + K - f) \quad (6)$$

The compensating lens 52 and the resonant scanner mirror 70 are offset ninety degrees in phase, so:

$$x = A*\cos(\omega*t) \quad (7)$$

$$G = D*\tan(Om*\cos(\omega*t + \pi/2)) \quad (8)$$

$$H = D/\cos(Om*\cos(\omega*t + \pi/2)) + C \quad (9)$$

The position and amplitude of the motion of lens 52 can be adjusted so that the focus point 590 closely tracks the surface of film 22. One way of doing this is to define the focus as being perfect at the center 550 and at two other points symmetrically spaced about the center 550.

When t=0, x is at a maximum and Om is 0. Therefore, the distance L from mirror 70 to focus point 590 will be the same whether the value of G is positive or negative, so only one non-zero value of G needs to be considered.

The focus is defined as being perfect when the distance from the lens 54 to the spot 86 on the film 22 is exactly equal to the distance to focus point 590. This occurs when the following equation is satisfied:

$$H=J \quad (10)$$

Substituting equation 7 into equation 6:

$$J=(A^*\cos(\omega^*t)+K)^*f\backslash(A^*\cos(\omega^*t)+K-f) \quad (11)$$

Substituting equations 9 and 11 into equation 10:

$$D/\cos(Om^*\cos(\omega^*t+\pi/2))+C=(A^*\cos(\omega^*t)+K)^*f/(A^*\cos(\omega^*t)+K-f) \quad (12)$$

One of the positions that will be defined as being in perfect focus is the center 550 of the image plane, which coincides with time t=0. Substituting a value of 0 for t in equation 12 gives the following equation:

$$A=(f^*(D+C+K)\text{-}K^*(D+C))\backslash(D+C\text{-}f) \quad (13)$$

Solving equations 13 and 12 simultaneously gives the following solutions for A and K:

$$A=((D^*f+f^*M^*C)/(D+M^*C-M^*f)+(f^*D+f^*C)/-1/(f\text{-}D\text{-}C)(M^*f^*S-D^*S-M^*C^*S)/(D+M^*C-M^*f)) \quad (14)$$

$$K=((f^*D+f^*C)/(D+C-f)+(D^*f+f^*M^*C)/(M^*f^*S-D^*S-M^*C^*S))/((D+M^*C-M^*f)/(M^*f^*S-D^*S-M^*C^*S)+1) \quad (15)$$

Where $M=\cos(Om^*\cos(\omega^*t+\pi/2))$ and $S=\cos(\omega^*t)$
From equation 8:

$$\omega^*t=\mathrm{acos}(\mathrm{atan}(G/D)^*(1/Om))-\pi/2 \quad (16)$$

Because the spot 86 is substantially out of focus at the maximum scan angle (Om), the image is confined to some smaller portion of the total scan. If T is the value of G at the edge of the usable portion of the scan, and P is the fraction of the maximum scan Om represented by T, then:

$$Om=\mathrm{atan}(T/D)/P \quad (17)$$

Combining equations 16 and 17:

$$\omega^*t=\mathrm{acos}(\mathrm{atan}(T/D)^*(P/\mathrm{atan}(T/D)))-\pi/2 \quad (18)$$

By substituting the right half of equation 18 for $\omega^*t$, and the right half of equation 17 for Om in equations 14 and 15, values can be found that will give a perfect focus simultaneously at the center point 550 and two other points defined as plus and minus a factor P times the maximum scan displacement.

If the distance from the lens 54 to the spot 86 on the surface of film 22 is subtracted from the distance to the focus point 590, the focus error R can be determined at any position 6:

$$R=J-H \quad (19)$$

Substituting the right halves of equations 9 and 11 for J and H in equation 19 gives:

$$R=(A^*\cos(\omega^*t)+K)^*f/(A^*\cos(\omega^*t)+K-f)-(D/\cos(Om^*\cos(\omega^*t+\pi/2))+C) \quad (20)$$

Figure 17:
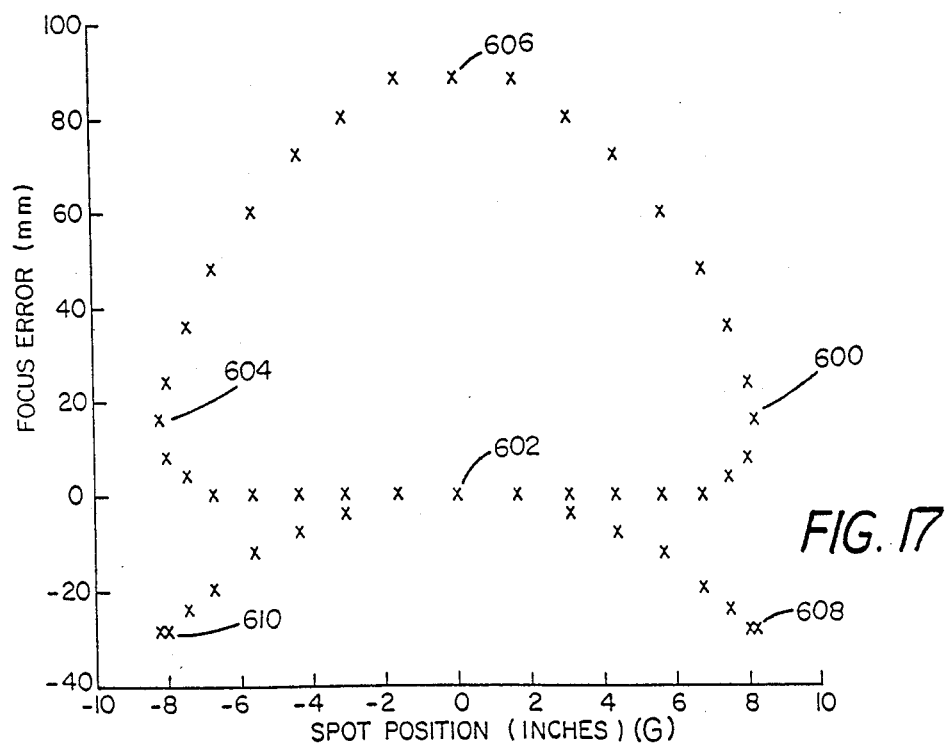
FIG. 17 is a graph of the focus error of the laser beam of FIG. 1 during scanning.

A plot of focus error R as a function of the displacement G of spot 86 is shown in FIG. 17. The plot from point 600 through point 602 to point 604 represents the forward trace 530 of the beam while the plot from point 604 through point 606 back to point 600 is the unused retrace 542. The plot from point 608 through point 602 to point 610 shows the focus error that results without the compensating motion of lens 52 coordinated with mirror 70.

Note that the fact that B changes slightly from scan line to scan does not alter the analysis with respect to any given scan line.

Other embodiments are within the following claims.

Figure 18:
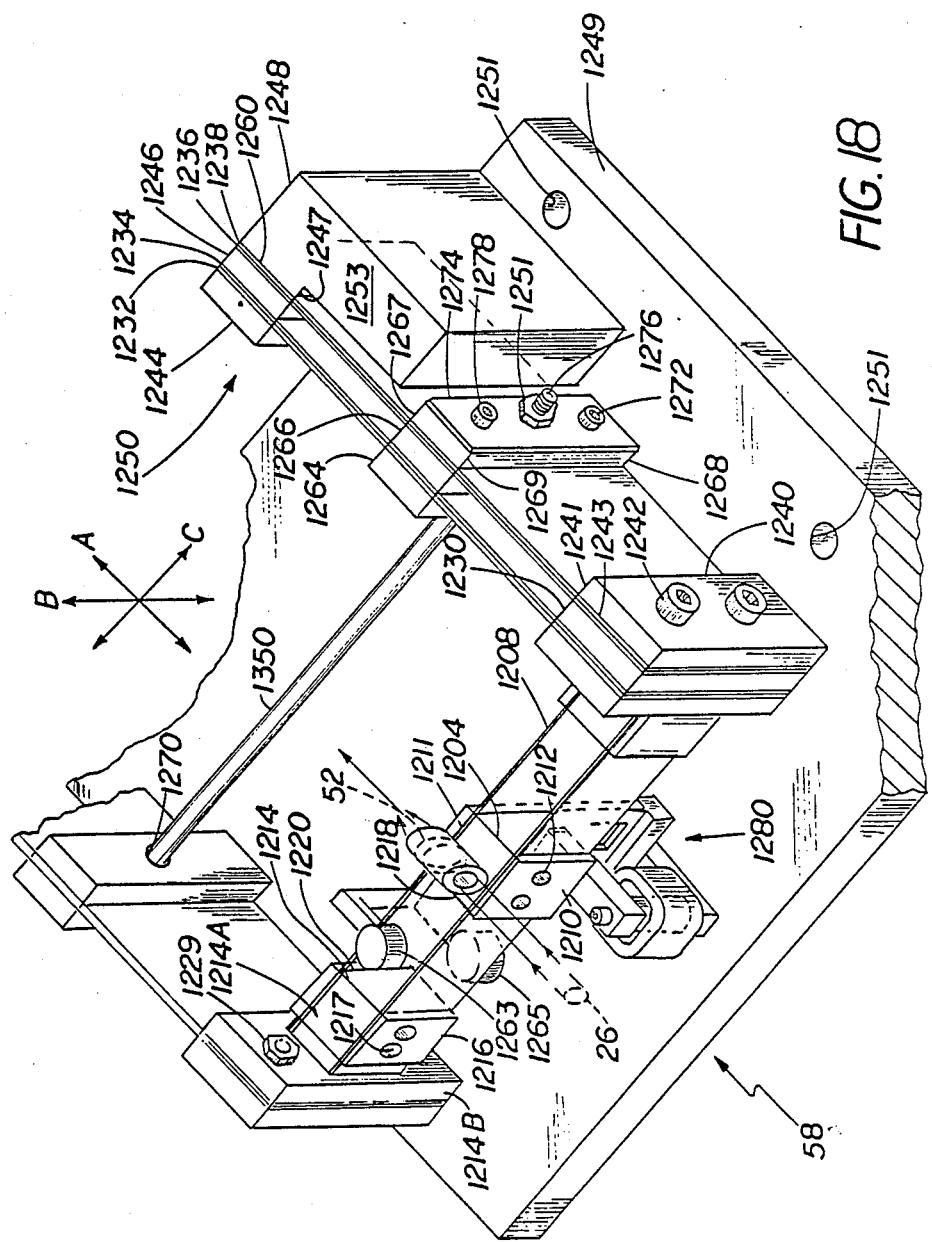
FIG. 18 is a perspective view of another embodiment of the fast focus lens assembly.
Figure 19:
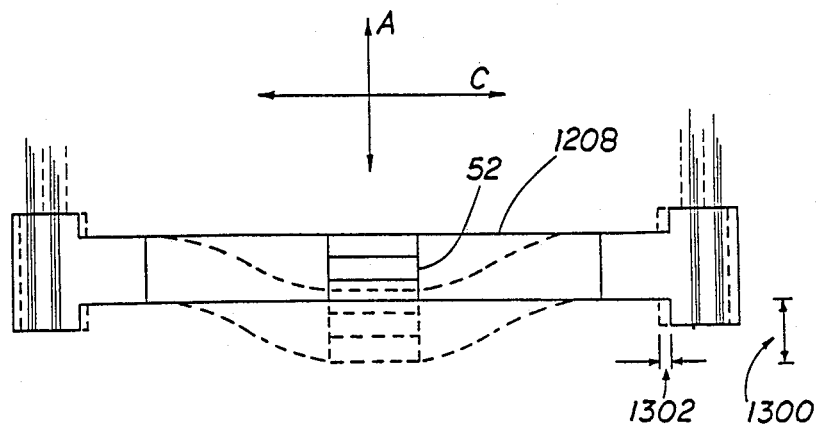
FIG. 19 is a view showing the deflection of the side and main flexures of the lens assembly of FIG. 18.

For example, referring to FIG. 18, lens assembly 58 could have a different configuration in which lens 52 is mounted in a nylon block 1204 (using two delrin screw nuts, not shown) in the path of laser beam 26. Block 1204 is clamped between two hardened and tempered blue steel rectangular main flexures 1208 by two aluminum clamp plates 1210, 1211. Machine screws 1212 pass through holes in plates 1210, 1211, main flexures 1208, and block 1204 to hold clamp plates 1210, 1211 against flexures 1208.

Main flexures 1208 are clamped at both ends to aluminum T-shaped blocks 1214 (where the leg of the T is 1214A and the head of the T is 1214B) by aluminum clamp plates 1216 (again, each pair of plates 1216 are held by a pair of machine screws 1217 which pass completely through the clamp plates 1216, the block 1214, and the main flexures 1208).

Main flexures 1208 are 0.350 inch wide, 0.010 inch thick, and 3.700 inches long. The active length of the main flexures, i.e. between an edge 1218 of block 1204 and an edge 1220 of block 1214, is 1.10 inches. Leg 1214A of block 1214 is 0.350 inch along the B dimension, 0.350 inch along the C dimension, and 0.667 inch along the A dimension (to where it meets head 1214B) and is centered on head 1214B, which is 1.000 inch (B), by 0.500 inch (A), by 0.13 inch (C). Plate 1210 is 0.350 inch (B), by 0.500 inch (C), by 0.062 inch (A). (Plate 1211 is described further below.)

Flexures 1208 are kept parallel by block 1204 and blocks 1214. While flexible in the A direction, the flexures 1208 are extremely rigid in both the B and C directions. This rigidity, combined with the inherent rigidity of the rectangular structure of the main flexures, prevents unwanted angular or translational motion other than along the optical axis defined by beam 26.

Clamped between each T-block 1214 and one of two corresponding aluminum spacer blocks 1230 is a second set of two hardened and tempered blue steel side flexures 1232, 1234. (There are two sets of two flexures 1232, 1234, one set clamped to each T-block 1214). A third set of two side flexures 1236, 1238 is clamped between each spacer block 1230 and one of two corresponding aluminum outside blocks 1240. The entire assembly including T-block 1214, flexures 1232, 1234, spacer block 1230, flexures 1236, 1238, and outside block 1240 is held together by two machine screws 1242 which pass completely through the outside block, the spacer block and both sets of side flexures and are secured by nuts 1229. Each of the spacer blocks 1230 and the outside blocks 1240 is 1.0 inch (B), by 0.125 inch (C), by 0.500 inch (A).

Each of the two sets of side flexures 1232, 1234 and 1236, 1238 are likewise clamped together at their opposite ends by an outside block 1244, a spacer block 1246, and a base block 1248 all held together by a pair of machine screws 1250. Block 1248 is cut away along a face 1253 in order to provide clearance for the side flexures. Each of the spacer blocks 1246 and utside blocks 1244 have dimensions identical to blocks 1230, 1240. Base block 1248 is 2.1 inches along the B dimension and 1.25 inches along the A dimension. Along the C dimension, in the portion of block 1248 bordered by a face 1260, the block is 0.62 inch and, in the porton of block 1248 bordered by face 1253, the block is 0.025 inch thinner than the portion bordered by face 1260.

Base block 1248 is attached not only to the side flexures but also is fixed to an anchor plate 1249. Anchor plate 1249 is securable (in a fixed position relative to the film) to the remainder of the plotter via screws (not shown) in holes 1251.

The flexures 1232, 1234, and 1236, 1238 are all 2.975 inches (A), by 0.12 inch (C), by 1.0 inch (B). The active length of the side flexures 1232, 1234 and 1236, 1238 in the A dimension is 0.8 inch (the side flexures have two active lengths, one between an edge 1241 of block 1240 and an edge 1269 of a block 1268 (described below) and a second between an edge 1267 of block 1268 and an edge 1247 of block 1248, each 0.8 inch long).

Side flexures 1232, 1234 and 1236, 1238 are, like main flexures 1208, flexible in only a single (C) dimension. The side flexures are extremely rigid in both the A and B dimensions; this rigidity resists the reaction force of the resonating lens assembly.

The side flexures are provided in pairs so as to resist motion in the C dimension. As the side flexures bend, the face of side flexure 1232 rubs against the face of side flexure 1234; the friction between the two flexures causes a large shearing force which highly damps any oscillation due to the bending motion. (Flexures 1236, 1238 likewise provided damping.)

The two corresponding faces 1260 of base blocks 1248 (only one base block 1248 is seen in FIG. 18) to which side flexures 1236, 1238 are clamped are spaced apart from one another (along the A dimension) 4.500 inches, which is 0.025 inch wider than the corresponding faces 1243 of end blocks 1240, thus springloading the side flexures and placing the main flexures under tension.

Each active length of the side flexures 1232, 1234, 1236, 1238 has a combined spring rate of 410 pounds per inch; however, because there are two active lengths (i.e. between block 1240 and block 1268 and between block 1268 and block 1248) the effective spring rate is reduced to approximately half, or 200 pounds per inch; finally since there are one group of side flexures on either end of the main flexures, the combined effective spring rate is 400 pounds per inch (2×200 pounds per inch.).

When there is no tension placed on main flexures 1208 the system has a resonant frequency of 180 Hz. However, with the tension exerted by the side flexures 1232, 1234 and 1236, 1238 (about ten pounds, i.e., 0.025 pounds×400 pounds per inch) the resonant frequency of the system is increased to 220 Hz. This results in a tunable range of 40 Hz, or plus or minus 20 Hz from the nominal (i.e. median) frequency of 200 Hz (achieved with five pounds added tension from the side flexures).

To adjust the tension applied by the side flexures, and thus the resonant frequency of the system, a 4–40 threaded mild steel tuning rod 1350 (5.20 inch (C)) is attached at either end to each of the two sets of side flexures by another set of blocks 1264, 1266, 1268 which clamp the side flexures (and keep them parallel); the threaded rod 1350 passes through a hole 1270 in blocks 1264, 1266, 1268, and is secured on the outer side of each block 1268 by a hex nut 1251. Blocks 1264, 1266, 1268 are held together by a pair of machine screws 1278.

Lens assembly 58 also includes a sensing system, which includes an LED 1263 mounted above sensor arms 1224, 1226, and a sensor 1265 for sensing the light generated by LED 1263.

The lens system is driven motion by a magnetic drive 1280, termed an induction drive scanner (as described in U.S. Pat. No. 4,502,752, incorporated herein by reference).

During operation, magnetic drive 1280 causes lens assembly 58, to oscillate harmonically at its resonant frequency in synchronism with (but 90° out of phase from) the scanner mirror 70.

Referring to FIG. 22, lens assembly 58 is shown in its center (or rest) position (solid lines). The location of the lens assembly at one of two points of maximum excursion is indicated by dotted lines. As the lens moves from its rest position, main flexures 1208 must bend (in the A dimension); as they bend, their length along the C dimension is effectively shortened; thus the side flexures must bend toward the lens and one another in the C dimension. The peak amplitude 1300 of the lens in the A dimension is 1.5 mm, which translates into a maximum deflection 1302 of 0.002 inch for the side flexures.

While it is desirable that the tension on the main flexures be constant over the entire range of motion of the lens assembly, the deflection of the side flexures causes some increased tension; however, given the spring rate of 400 pounds per inch and the maximum deflection of 0.002 inch, the deviation between the tension applied to the main flexures in the rest position and in the maximum excursion position is only 0.8 pounds, a sufficiently close approximation to 0 pounds, the desired deviation.

In other embodiments, by choosing different parameters for various elements of lens assembly 58 (particularly the dimensions of the side and main flexures) a different range of resonant frequencies can be achieved. The tunable range of the lens assembly is generally 10% of the nominal resonant frequency. The achievable nominal resonant frequencies are, approximately, from 20 Hz to 1000 Hz.

I claim:

1. In a surface-scanning system defining an optical path and having a scanning assembly comprised of X and Y angularly oscillating scanners for deflecting a portion of said path, and first and second optical elements aligned with stationary portions of said optical path and driven in rectilinear oscillating motions along said path to provide focus correction respectively for said X and Y scanners, the improvement wherein said X direction scanner is of the resonant type and provided with means for dynamically tuning its resonant frequency, said first optical element is mounted to oscillate in rectilinear resonant motion, and said tuning means of said X direction scanner is arranged to receive a signal representing the oscillations of said first optical element and to tune the resonant frequency of said X direction scanner to synchronize its resonant motion with that of said first optical element.

2. The scanning system of claim 1 having multiple selectable positions along said optical path for said surface being scanned relative to said scanning assembly, and optical element positioning means adapted to position the center location of said second optical element, through which said second optical element moves during scanning, at any one of a plurality of predetermined locations along said optical path generally to focus the scanning system in accordance with a corresponding one of said selectable positions of said surface.

3. The scanning system of claim 2 further comprising means for defining an array of pixels on said surface being scanned, the number of pixels in said array being the same for all of said selectable positions.

4. The scanning system of claim 1 wherein said first optical element is arranged to achieve said focus correction with respect to motion of said X scanner, and is driven resonantly at a fixed frequency.

5. The scanning system of claim 1 wherein said second optical element is arranged to achieve said focus correction with respect to motion of said Y scanner, and is driven non-resonantly.

6. The scanning system of claim 1 wherein said surface comprises a light sensitive film, said optical path carries a beam of light from a source to said surface, and said source is modulated on the basis of digital data corresponding to an image.

7. The scanning system of claim 6 wherein said digital data comprises data acquired in a medical procedure.

8. The scanning system of claim 6 wherein said data comprises gray-scale data.

* * * * *

UNITED STATES PATENT AND TRADEMARK OFFICE
CERTIFICATE OF CORRECTION

PATENT NO. : 4,797,749

DATED : January 10, 1989

INVENTOR(S) : Paulsen

It is certified that error appears in the above-identified patent and that said Letters Patent is hereby corrected as shown below:

U.S. Patent Documents

| | | | |
|---|---|---|---|
| 2,488,734 | 11/1949 | Mueller | 171/119 |
| 2,570,125 | 10/1951 | Hoare et al. | 177/311 |
| 2,640,866 | 6/1953 | Powell | |
| 2,928,057 | 3/1960 | Jarger | 333/71 |
| 3,102,233 | 8/1963 | Charbonneaux | 324/125 |
| 3,256,769 | 6/1966 | Matthews | 88/14 |
| 3,532,408 | 10/1970 | Dostal | 350/6 |
| 3,678,308 | 7/1972 | Howe | 310/36 |
| 3,742,234 | 6/1973 | Laakmann | 250/235 |
| 3,811,748 | 5/1974 | Treuthart | 350/7 |
| 3,921,045 | 11/1975 | Reich et al | 318/127 |
| 4,032,888 | 6/1977 | Broyles et al | 340/146.3 |
| 4,037,231 | 7/1977 | Broyles et al | 346/108 |
| 4,047,792 | 9/1977 | Dale, Jr. et al. | 350/6 |
| 4,063,287 | 12/1977 | van Rosmalen | 358/128 |
| 4,073,567 | 2/1978 | Lakerveld et al | 350/6.5 |
| 4,274,101 | 6/1981 | Kataoka et al | 346/108 |
| 4,302,720 | 11/1981 | Brill | 324/146 |
| 4,318,582 | 3/1982 | Minoura et al | 350/6.6 |
| 4,472,024 | 9/1984 | Konomura et al | 350/247 |

Foreign 804694      11/1958     UK

Other Prior Art

Tweed "Resonant Scanner Linearization Techniques," Laser Scanning and Recording, SPIE vol. 498, pp. 161-168.

Tweed "Linearizing Resonant Scanners," Lasers and Applications, August, 1985, pp. 65-69.

Pelsue "Precision, post-objective, two-axis, galvanometer scanning,

UNITED STATES PATENT AND TRADEMARK OFFICE
CERTIFICATE OF CORRECTION

PATENT NO.   : 4,797,749

DATED        : January 10, 1989

INVENTOR(S)  : Paulsen

It is certified that error appears in the above-identified patent and that said Letters Patent is hereby corrected as shown below:

SPIE Vol. 390-High Speed Read/Write Techniques for Advanced Printing and Data Handling, 1983, pp. 70-78.

Paulsen, USSN 932,924, filed November 18, 1986.

Schermer, USSN 932,654, filed November 18, 1986.

In the Specification
Col. 4, line 37, "eample" should be --example--.
Col. 6, line 67, "angles a" should be --angles a--. (add italics)
Col. 15, line 14, "utside" should be --outside--.
Col. 16, line 21, insert --in resonant-- after "driven".

Signed and Sealed this

Sixth Day of March, 1990

Attest:

*Attesting Officer*

JEFFREY M. SAMUELS

*Acting Commissioner of Patents and Trademarks*